United States Patent [19]

Potter et al.

[11] Patent Number: 5,819,842

[45] Date of Patent: Oct. 13, 1998

[54] METHOD AND APPARATUS FOR TEMPERATURE CONTROL OF MULTIPLE SAMPLES

[76] Inventors: Derek Henry Potter, The Glen, Chardstock Axminister, Devon; Colin Gerald Potter, 12 Beech Road, Headington, Oxford, OX3 7RR; John Michael Old, 5 Hillary Way, Wheatley, Oxon; John Irving Bell, The Dairy, Lower Street, Islip, Oxon, all of United Kingdom

[21] Appl. No.: 516,692

[22] Filed: Aug. 18, 1995

Related U.S. Application Data

[63] Continuation of Ser. No. 855,740, Mar. 23, 1992, abandoned.

[30] Foreign Application Priority Data

Dec. 5, 1991 [FI] Finland .................................... 915731

[51] Int. Cl.$^6$ .......................... F25B 29/00; G05D 23/20; B01L 7/02
[52] U.S. Cl. ......................... 165/206; 165/263; 165/64; 165/48.1; 435/289; 435/290; 62/3.2; 422/109; 219/543; 935/87; 935/88
[58] Field of Search .................................... 422/116, 109; 435/289, 290; 935/87, 88; 165/206, 263, 64, 48.1, 61; 62/3.2, 3.3; 219/543

[56] References Cited

U.S. PATENT DOCUMENTS

| 2,739,220 | 3/1956 | Morey . | |
|---|---|---|---|
| 3,143,167 | 8/1964 | Vieth | 165/64 |
| 3,360,032 | 12/1967 | Sherwood | 165/30 |
| 4,548,259 | 10/1985 | Tezuka et al. | 62/3.2 |
| 4,724,182 | 2/1988 | Kato et al. | 219/543 |
| 4,785,150 | 11/1988 | Kojima et al. | 219/543 |
| 4,795,887 | 1/1989 | Myokan | 219/543 |
| 4,806,739 | 2/1989 | Kajima et al. | 219/543 |
| 4,865,986 | 9/1989 | Coy et al. | 435/290 |
| 4,950,608 | 8/1990 | Kishimoto | 435/290 |
| 5,061,630 | 10/1991 | Knopf et al. | 435/290 |
| 5,142,609 | 8/1992 | Chun | 435/291 |
| 5,158,132 | 10/1992 | Guillemot | 165/30 |
| 5,161,609 | 11/1992 | Dutertre et al. | 165/61 |
| 5,176,202 | 1/1993 | Richard | 435/290 |

FOREIGN PATENT DOCUMENTS

| 0 200 362 A3 | 12/1986 | European Pat. Off. . | |
| 0 236 069 A2 | 9/1987 | European Pat. Off. . | |
| 0 381 501 A2 | 8/1990 | European Pat. Off. . | |
| 1149079 | 7/1986 | Japan | 435/290 |
| 89/09437 | 10/1989 | WIPO . | |
| 90/05329 | 5/1990 | WIPO . | |
| 91/09141 | 6/1991 | WIPO . | |

OTHER PUBLICATIONS

F. Van Leuven, *Trends in Genetics*, 1991, 7, p. 142.
R. Hoelzel, *Trends in Genetics*, 1990, 6, pp. 237–238.

*Primary Examiner*—John K. Ford
*Attorney, Agent, or Firm*—Kubovcik & Kubovcik

[57] ABSTRACT

Independent control of multiple samples which are in close proximity. All the samples in a sample container designed for rapid heat transfer and can be independently regulated to a set point using a temperature feedback control with the temperature monitored by a temperature sensitive element. This is implemented by heating each sample independently and at the same time a cooling device produces a substantial and continuous heat flow from the sample in order to permit an adequate rate of cooling when required. The rate of heat flow through the cooling device is partly determined by a thermal resistance which is included to control the pattern and maximum rate of heat flow to designed levels. By keeping the thermal mass of the temperature controlled components to a minimum it is also possible to change the temperature of the samples very rapidly.

15 Claims, 1 Drawing Sheet

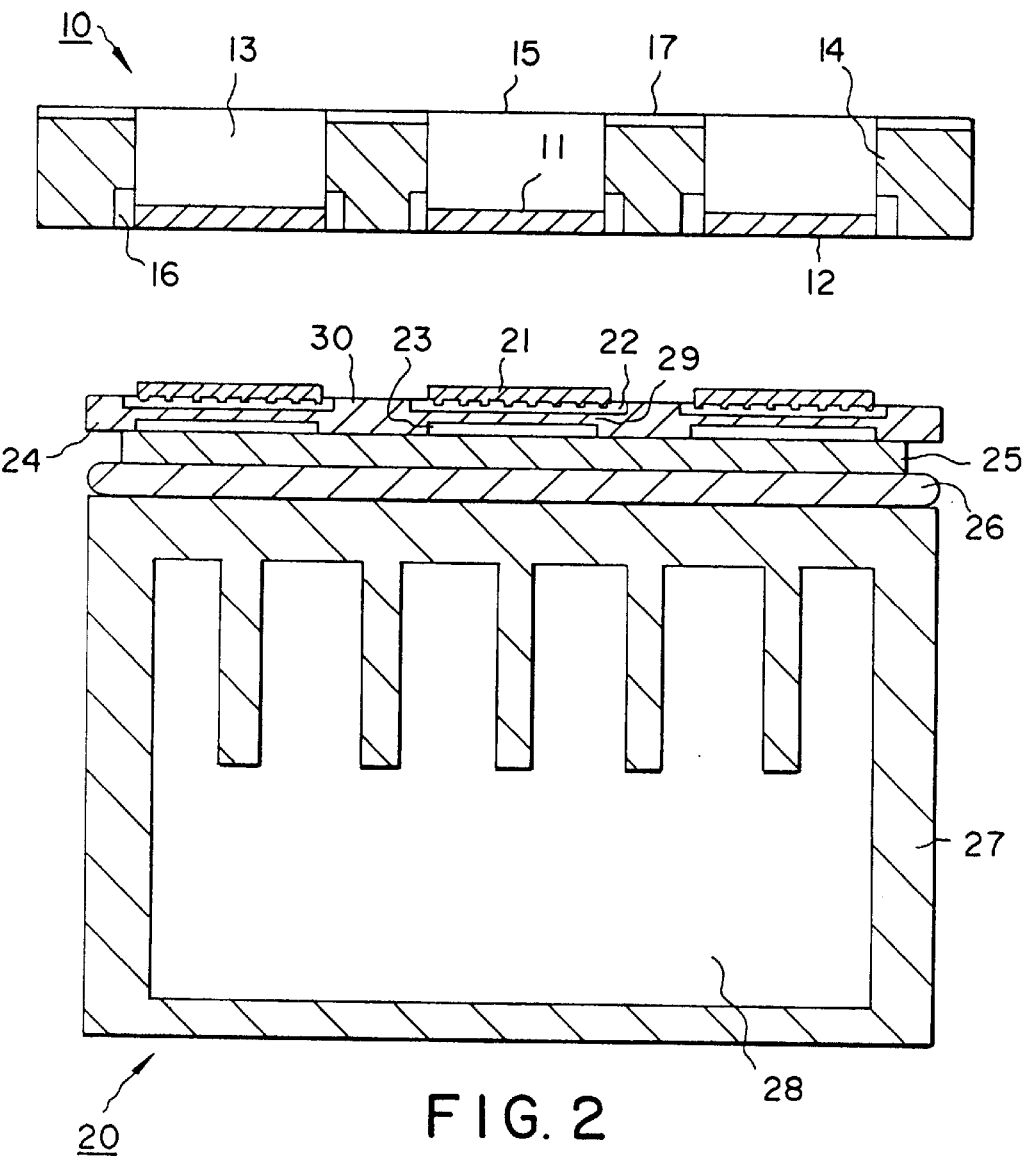
FIG. 1
FIG. 2
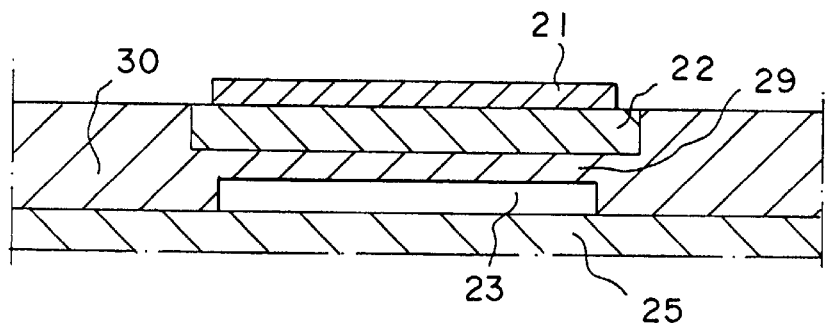
FIG. 3

METHOD AND APPARATUS FOR TEMPERATURE CONTROL OF MULTIPLE SAMPLES

This application is a continuation of application Ser. No. 07/855,740 filed Mar. 23, 1992 now abandoned.

BACKGROUND OF THE INVENTION

The laboratory analysis of samples under experimental conditions often requires that their temperature be held as constant as possible or be varied according to a predetermined time course. Full sample analysis may need different temperature regimes to be applied and as many sets of heating apparatus as there are samples may have to be provided. Alternatively, one or a few sets of apparatus may be used sequentially but this poses problems of reproducibility, for example, where the samples are not easily stored or are unstable. In addition, in a busy laboratory, there may be several experimenters who need apparatus for different time and temperature regimes and this therefore requires yet more equipment or curtailing of activities until an apparatus is free.

Examples of the type of samples envisaged are found in many aspects of biochemistry. As an example, it may be necessary to carry out enzyme reactions at different temperatures to find optimum reaction rates. The effect of the duration of a reaction will also need to be investigated as the rate of reaction may slow or even reverse after long incubations. The combination of the time and temperature parameters leads to lengthy experiments in which the results are not always consistent if done on different days because this may give rise to unavoidable differences in assay conditions.

A second example is in molecular biology where the rates of hybridization and melting of nucleic acids is investigated. Here the variation of time and temperature are also most important. Optimum times and temperatures are required for the most specific hybridization of RNA/DNA heteroduplexes which may be vizualised using an electron microscope and analysed for tertiary structure.

A third example is in the thermal cycling of samples for amplification of DNA, (the polymerase chain reaction, PCR™ Cetus Corp. USA). In this process (Europe appl. Nos. 87301669.5 & 86302298.4), samples of DNA are heated in a solution until they melt and become single stranded. The temperature is then reduced allowing a pair of short oligonucleotides in the mixture to hybridize to opposite strands of the DNA, at a distance apart defining the sequence of interest. These annealed oligonucleotides act as primers to a thermophilic DNA polymerase (Int. Patent Appl. No. PCT/US90/07369) allowing DNA synthesis to proceed until the length of a double strand is at least as long as the sequence of interest. Upon remelting the products and repeating the process, sequences of exactly the length specified by the positions of the oligonucleotides are formed. These then can be cycled as many times as needed. This valuable method needs good temperature control because if the melting is insufficient or at such a high temperature that the components of the mixture are degraded, then the efficiency of the process will deteriorate. Similarly the annealing of the oligonucleotides is critically dependent on temperature and there will also, be an optimum temperature for the best synthesis rate. A method for amplification of cDNA which has been copied by reverse transcriptase from mRNA also exists. Here the optimum conditions and temperature for stability of primary heteroduplexes must be balanced with reduction of secondary structure for the most efficient cDNA synthesis. In either technique, the product should roughly double at each cycle, and it can be seen that small changes in efficiency make a great difference to the final quantity of product.

Another amplification technique is where a thermophilic ligase is used to join two pairs of oligonucleotides hybridized to opposite strands of DNA but at the same site. The joined pairs become templates for subsequent cycles giving large and easily detected amounts of double oligonucleotide product. If there is a pairing mismatch then hybridization will fail and the process will not start. In this way mutant sites may be detected but it can be seen that the oligonucleotide hybridization is most critical and this is very sensitive to temperature.

A final example of temperature regulation is for the growing of cells in tissue culture. Usually incubators are used at a fixed temperature but a number of cell types grow better at slightly different temperatures. Finding the optimum temperature is usually a long and difficult procedure if growth rates are compared in sequential experiments with the incubator set at different temperatures. The expression of some proteins is also greatly affected by temperature, (the heat-shock proteins), and research into the mechanisms involved would be greatly facilitated by the possibility of having different wells of a tissue culture plate held accurately at different temperatures for different times or cycled to find optimal effects of temperature on the system in question.

PRIOR ART

Some progress towards the control of sample temperatures has already been achieved. Many machines are available which control the temperature of a single heating and cooling block, suitable for holding small conical tubes known as Eppendorf tubes. These tubes are made of polypropylene and, unfortunately, are poor at conducting heat. To overcome this problem some machines are designed for tubes specially made with thin side walls.

In many of the machines there is a metal heating and cooling block in which the tubes are inserted. The block may be heated and cooled by Peltier thermoelectric devices or by circulation of hot or cold liquids through channels in the block (L. J. Johnson et al., European Patent Appl. No. 87301669.5). In many other machines electrical heating is employed but a heat-emitting bulb has also been used (P. D. G. Dean & M. J. Evans, Int. Patent No. PCT/GB89/00323). In any of these machines it is difficult to get reproducibly similar thermal contact for each sample and as the heat flows are passive, it is also inevitable that there are differences in temperature between different positions in the block (F. van Leuven, Trends in Genetics, 1991, 7, p 142) and other defects that have been clearly described elsewhere (R. Hoelsel, Trends in Genetics, 1990, 6, 237–238). In an alternative approach (B. C. Sykes, Int. Patent No. PCT/GB89/1339) using water as the heat conducting medium, then the temperature changes in each sample should be similar because of the large mass of water with its high specific heat. This is however also a disadvantage as it does not permit the rapid temperature changes needed for some applications. In another different approach hot gas has been used to heat samples in thin-walled cuvettes (P. N. Schnipelsky et al., European Patent Appl. No. 90301061.9) in an apparatus to conduct PCR™ with containment to prevent contamination of the laboratory by PCR™ product.

Some machines have more than one temperature regulated heating block (e.g., up to five) and, although this indicates the need for independent temperature control of samples, this merely represents the housing of several machines in a single case, albeit with a single computing means for control.

SUMMARY OF THE INVENTION

For the independent control of multiple samples, necessarily in close proxity, then novel techniques are required. Herein is describe how all the samples in a sample container designed for rapid heat transfer can be independently regulated to a set point using a temperature feedback control with the temperature monitored by a temperature sensitive element. This is implemented by heating each sample independently whilst at the same time a cooling means produces a substantial and continuous heat flow from the sample in order to permit an adequate rate of cooling when required. The rate of heat flow through the cooling means is partly determined by a thermal resistance which is included to control the pattern and maximum rate of heat flow to designed levels. By keeping the thermal mass of the temperature controlled components to a minimum it is also possible to change the temperature of the samples very rapidly. For interacting samples, for example where one sample to be cooled is surrounded by hot samples, a reduced ramp rate will be acheivable. By controlling the ramp rate to slower than the worst case for interacting samples, the machine will produce very reproducible temperature changes and time courses which will still be favourably rapid compared with many single block designs. This precision will still be in evidence if such a machine is used in a single block mode with all samples following the same temperature and time course but with performance greatly improved for precise and reproducible temperature control of a large number of samples. The individual control of each sample temperature, however, greatly facilitates multi-user applications.

The method and the machine we describe should therefore improve the utility of many techniques needing precise temperature control.

The above and other features and advantages of this invention will become better understood by reference to the detailed description that follows, when considered in connection with the accompanying drawings. The invention will now be described by way of an example.

BRIEF DESCRIPTION OF THE DRAWINGS

FIG. 1 is a cross section of the sample plate.

FIG. 2 is a cross section of the temperature control unit.

FIG. 3 is a detail of the temperature control unit of FIG. 2.

DETAILED DESCRIPTION OF A PREFERRED EMBODIMENT

In FIG. 1, within the sample plate 10, the sample 11 is in the form of a thin disc of fluid. The sample 11 lies above the Thin plastic foil 12 and is therefore in good thermal contact with the underside of the foil 12. This is presented to the temperature controlled surface of the spreader plate 21 in FIG. 2. Thus the sample 11 is in good thermal contact with the spreader 21. The samples 11 are contained in wells 13 of low thermal mass, and these are connected by plastic webbing 14 of low thermal conductivity. The wells 13 are sealed at the top by sealing foil 15 and sticky seal 17 or heat seal after the samples 11 are placed in them.

In the temperature control unit 20 in FIG. 2 the spreader plate 21, which has high thermal conductivity, is in close contact with the cooling means, the cooling means and the temperature sensing means.

These are constituted as a temperature controller, which therefore has a close control on the temperature of the base of the sample. Because the sample 11 is thin, the whole of it is under the same control.

In addition to the sample 11, the temperature control has to change and maintain the temperature of the plastic foil 12 and the sample wells 13. Being of low thermal mass, these do not dominate the thermal load on the controller, which is therefore largely determined by the sample 11 alone.

The optional spreader plate 21 evens out the temperature differences across the temperature controlled surface. These arise because of manufacturing limitations.

Residual temperature differences in the sample 11 itself arise because of heat flows through it. These are minimized by positioning the webbing above the sample 11, as shown at a portion 16 of the webbing 14 in the diagram, and by suitably dimensioning it and the well 13 walls. The resultant low thermal connection to other temperatures is further reduced if the top or sides of the well are maintained at or around the required temperature. Since this is to reduce a small error, the control accuracy does not have to be as great as the main temperature controller beneath the plastic foil 12.

The base of the well 13 is likewise shielded. In this case implementation can be by a metal, ceramic or plastic conductive collar, in the position 16 of the webbing 14 shown cut out in the diagram and in good thermal contact with the temperature controlled surface, or the spreader plate 21 if fitted.

By restraining the sample plate 10 from moving vertically, the natural tendency of the plastic foil 12 to bulge when the sample 11 is heated is exploited to improve the thermal contact with the temperature controlled surface. At the same time the mechanical stress in the foil 12 is relieved by the support of the spreader plate 21.

In FIG. 2, the heating element and temperature sensor Means are shown combined as a Heater Element/Temperature Sensor 22 because in practice they can be built very close together or even combined in one part. The cooling means is determined by the overall thermal resistance to the cold block 25. The resistance comprises two main paths; the largely vertical path through the disc 29 of matrix material beneath the heater element/temperature sensor 22, and the largely radial path 30 from the edge of the heater element/temperature sensor 22 with the heat finally flowing down into the cold block 25.

The main paths of the resistance are also shown in FIG. 3 that describes a detail of the temperature control unit. The vertical path goes through the disc 29 of matrix material beneath the heater element/temperature sensor 22, and the radial path 30 goes from the edge of the heater element/temperature sensor 22 down to the cold block 25.

For a matrix made of high conductivity, the disc of matrix material can be augmented by a disc 23 of higher thermal Resistance. A visual indicator of the temperature of the matrix 24 at a sample position may be implemented by thermochromic paint on or in the matrix 24.

In the diagram, the thickness of the matrix 24 is considerably less than the spacing between sample positions. Consequently most of the radial flow does not reach the adjacent samples but flows to the cold block 25. The geometry may be improved by thinning the matrix 24 between the sample positions. It is then optional whether the matrix 24 dips down to the cold block 25 or whether a thermal bridge is built up from the cold block 25 to the matrix 24 to intercept and divert most of any heat flow.

Heat flows between samples are thus minimized. What remains impose their own requirements on the temperature controller. Since the latter is best implemented as a closed loop system, they have a negligible effect on the acheived temperatures.

Owing to the small thermal masses, it is possible to change the temperature of the samples 11 very quickly; virtually all of any change in heat output from the heating means initially flows into or out of the sample 11.

An important component of the cooling means is the cold part, labelled as a cold block 25. In the diagram it is common to several or all of the sample positions. The cold block 25 is cooled by a thermoelectric device 26. By using a large metal block, the heat flow is evened out over the area of the thermoelectric device 26. It is also evened out over time which permits a better response under some circumstances, especially if the cold block 25 has a thermal capacity of several times that of the samples 11. The cold block 25 is maintained at approximately the same temperature all the time, thus eliminating potentially harmful cycling of the thermoelectric device 26.

Waste heat is eliminated by the heat conducting block 27 which requires a fluid coolant 28 of some kind. This may be air, water or other. In practice, water cooling is convenient.

The method according to the invention controls the temperature of samples which are in close enough proximity for any regulating change in the temperature of one sample to otherwise affect the temperature of another sample. The temperature at some desired set point for each sample in a sample container is independently controlled by the following steps. Each sample is heated by a separate heating means, the separate heating of samples is opposed by cooling every sample continuously by a cooling means, the temperature of the sample is measured by a temperature sensing means, the temperature of the sample is compared with the temperature of the set point, and the heating means is regulated according to the said comparison.

The cooling of the samples is provided by a cooling means that is composed of a thermal resistance and a cooled part at a temperature substantially lower than that of the sample. The temperature of samples 12, 24, 48, in number or, preferably, 96 samples is independently regulated.

For independent control of the temperature at some desired set point for each sample in a sample container the apparatus is provided by a separate heating means to heat each sample as required, a cooling means for cooling every sample continuously, a temperature sensing means to measure the temperature of the sample, a regulating means to regulate the heating means according to the temperature of the sample measured and the temperature of the Set Point.

A cooling means is composed of a thermal resistance and a cooled part at a temperature substantially lower than that of the sample and with said thermal resistance being placed between the heating means and the cooled part. For heating the samples the heating means are resistive heating elements heated electrically by ohmic resistance. The resistive heating element is a flat deposition or adhesion of copper or other metal or other conductor onto matrix (24) or fused to or fused into said matrix. The matrix is an insulator composed of plastic loaded glass fibre, ceramic alumina or aluminium nitride, glass or plastic which is deposited on any other of these materials either alone or themselves deposited on steel or other metals.

The resistive elements are in a pattern allowing uniform heating of the sample, for example as a spiral, zig-zag both straight or bent in a curve, or other meandering pattern permitting increased length of the track to provide suitable resistance within a small area. The pattern of the resistive elements of the heater provide a non-uniform heat supply to compensate for uneven heat flow from the controlled region to give an improved temperature uniformity.

The pattern of the resistive elements of the heater is provided to apply heat to the periphery of the temperature controlled surface to compensate for radial heat loss. The radial heat loss is a substantial proportion of heat flow from the region and provides a substantial part of the cooling means. Heat is applied to regions substantially smaller than the total heat controlled area to compensate for heat flow through essential parts of the structure.

A collar of heat conducting material is placed around the base of each well of the sample container plate either in thermal contact with the sample plate or matrix (24) to permit better heat transfer characteristics. The collar is provided to minimize temperature differences within the sample. The collar is, for example, 3 mm or lower in height, 2 mm or less in thickness and 3–15 mm, in diameter.

The spreader plate of a good heat conductor is between the sample container and the thermal resistance. The collar and spreader plate can also be combined. The collar or spreader plate or combination may be heated independently of the heating element.

The temperature is sensed by a temperature sensing means in close proximity to the sample well. The temperature can also be sensed by a temperature dependent resistive track which is a flat deposition or adhesion of copper or other metal or other conductor onto a matrix as bears the heating element or is fused to or fused into said matrix. Alternatively the temperature is sensed by a temperature dependent resistive track which is also the heating element deposited on or fused to or fused into the matrix.

The temperature rise is limited to some maximum safe level by the inherent rise in resistance of the heating element. The cooling of the samples is by their contact with the matrix cooled part via the thermal resistance comprising a layer of the matrix material with the optional addition of another layer such as air or other material with suitable thermal resistance to give the required heat flow.

The cooling of the cooled part is by air or water flow, at least one thermoelectric device or refrigerated liquid circulation. If the thermoelectric devices are used, the heat produced is removed by air or water flow or refrigerated liquid circulation.

The samples are placed in a plastic plate with sample wells constructed so that the bottom of the wells are thin preferably less than 0.25 mm and most preferably about 0.025 mm, for best heat transfer to and from the sample. The plate is formed by producing holes in a plastic sheet and sealing plastic foil to the base of the sheet forming a welled sample container. The geometry of the plate is such that the sample volume is up to 100 $\mu l$ and preferably about 25 $\mu l$ so that the sample thickness is less than 5 mm and preferably about 1 mm to permit rapid changes in temperature of the sample.

The heat flow from one sample to another through the substance of the plate is minimized by having thin webs of material connecting the wells diagonally. The webs of material are connected to the sample containers above the level of the sample to minimize cross flow of heat. The top of the plate is sealed with a sticky or a heat sealed foil to prevent contamination to or from the well.

The mechanical stress on the thin bases of the sample wells is reduced by the positioning of the sample wells so that any pressure tending to make said bases bulge will be restrained by at least one temperature controlled surface.

The samples are placed in strips of wells, preferably 8 or 12 per strip for each user to house their own samples. The top of the sample container is covered with a lid bearing heating elements to prevent condensation from each sample. The heating elements minimize unwanted heat flows to and from the sample. For multiple user strips the top of each strip of sample container wells is covered with a lid bearing heating elements to prevent condensation from each sample.

The heat input is regulated by the set point, or the temperature according to the temperature sensing means. The cooled part has a high thermal mass to even out the total heat flow to be removed. The cooled part incorporates a temperature control to avoid undue temperature fluctuations.

The samples are arranged as an array, preferably in rows of 12 and most preferably as an array of 8 by 12 for 96 samples in microtration plate format.

We claim:

1. Apparatus for controlling the temperature of samples which are in close enough proximity for a change in the temperature of one sample to otherwise affect the temperature of another sample, wherein the apparatus independently controls the temperature at a desired set point for each sample, the apparatus comprising:
    (1) a sample plate having a plurality of sample containers for containing individual samples;
    (2) a separate heating means in contact with each sample container for separately heating each sample;
    (3) a cooling means for continuously cooling all samples;
    (4) temperature sensing means for sensing the temperature of each sample;
    (5) a collar of heat conducting material surrounding a base of each sample container;
    (6) a spreader plate of a heat conductor located between the base of each sample container and the associated heating means;
    (7) at least one of said collar and said spreader plate being heated independently of the associated heating means; and
    (8) regulating means for regulating each of the heating means according to the temperature of respective samples sensed and the temperature of the set point for each sample.

2. Apparatus according to claim 1 wherein the collar is no more than 3 mm in height, no more than 2 mm in thickness and 3–15 mm in diameter.

3. Apparatus according to claim 1 wherein the collar and spreader plate are integrally combined.

4. Apparatus according to claim 3 wherein means are provided whereby the collar and spreader plate can be heated independently of the heating means.

5. Apparatus for controlling the individual temperatures of a plurality of samples which are in close enough proximity for a change in the temperature of one sample to affect the temperature of another sample, wherein the apparatus independently controls the temperature at a desired set point for each sample, the apparatus comprising:
    a) a sample plate having a plurality of sample containers for containing individual samples;
    b) each such sample container having:
        1) base,
        2) a spreader plate of heat conducting material located beneath and in thermal contact with the base of the container, and
        3) a collar of heat conducting material surrounding the base of the container and in thermal contact therewith,
    c) a separate first heating means in thermal contact with each sample container for separately heating each sample;
    d) additional heating means for heating at least one of the spreader plate and the collar of each sample container independently of the associated first heating means,
    e) a cooling means for continuously cooling all the samples, said cooling means comprising:
        1) a cooling block adapted to be maintained at a temperature substantially lower than that of the set point of any of the samples, and
        2) means providing a path for the flow of heat from each of the samples to the cooling block,
        3) said means including a thermal resistance associated with each sample container and located between the sample container and the cooling block,
    f) temperature sensing means for sensing the temperature of each sample; and
    g) regulating means for regulating each of the heating means according to the sensed temperature of each respective sample and the temperature of the set point for each sample.

6. Apparatus according to claim 5 wherein said first heating means has resistive heating elements heated electrically by ohmic resistance.

7. Apparatus according to claim 6 wherein the resistive elements of said heating means are in a meandering pattern thereby permitting increased length to provide suitable resistance within a small area.

8. Apparatus according to claim 7 wherein the pattern of the resistive elements of the first heater is provided to the periphery of the sample containers.

9. Apparatus according to claim 5 wherein said first heating means has a resistive heating element which is a metal conductor coupled to a disc of a matrix material.

10. Apparatus according to claim 9 wherein the matrix material is an insulator composed of ceramic alumina.

11. Apparatus according to claim 5 further comprising a spreader plate of a heat conductor located between each sample container and the thermal resistance.

12. Apparatus according to claim 5 further comprising at least one thermoelectric device in contact with the cooling block for cooling the cooling block.

13. Apparatus according to claim 5 wherein the thickness of the bottom of the containers is less that 0.25 mm.

14. Apparatus according to claim 5 wherein the geometry of each sample container is such that the sample volume is up to 100 $\mu l$ and the sample thickness is less than 5 mm.

15. Apparatus according to claim 5 wherein the top of a sample container is covered with a lid bearing heating elements to prevent condensation from each sample.

* * * * *